United States Patent
Hsu et al.

(10) Patent No.: US 7,177,237 B2
(45) Date of Patent: Feb. 13, 2007

(54) METHOD OF DETECTING ORIENTATION OF OPTICAL DISK DRIVE

(75) Inventors: Jen-Yu Hsu, Taipei (TW); Hsiang-Yi Fu, Taipei (TW); Tun-Chieh Lee, Taipei (TW); Fu-Hsiang Chen, Taipei (TW); Yao-Chou Tsai, Taipei (TW)

(73) Assignee: Lite-On IT Corporation, Taipei (TW)

( * ) Notice: Subject to any disclaimer, the term of this patent is extended or adjusted under 35 U.S.C. 154(b) by 675 days.

(21) Appl. No.: 10/721,027

(22) Filed: Nov. 24, 2003

(65) Prior Publication Data

US 2004/0105350 A1 Jun. 3, 2004

(30) Foreign Application Priority Data

Nov. 29, 2002 (TW) ............................... 91134890 A

(51) Int. Cl.
G11B 7/085 (2006.01)
(52) U.S. Cl. ................... 369/30.15; 369/44.32
(58) Field of Classification Search ............ 369/30.15, 369/44.32, 30.12, 30.17, 53.19, 30.1, 30.11, 369/30.03, 30.01
See application file for complete search history.

(56) References Cited

U.S. PATENT DOCUMENTS 5,412,637 A * 5/1995 Kagami et al. .......... 369/44.32
6,122,237 A * 9/2000 Ohmori et al. .......... 369/53.19

* cited by examiner

Primary Examiner—Ali Neyzari
(74) Attorney, Agent, or Firm—Thomas, Kayden, Horstemeyer & Risley

(57) ABSTRACT

The present invention discloses a method of detecting orientation of an optical disk drive. Firstly, a first moving distance is measured by using a first force driven on a movable optical pick up head of the optical disk drive for a preset period. Next, a second moving distance is measured by using a second force driven on the movable optical pick up head for the preset period, wherein the second force and the first force have opposite direction but the same amplitude. Next, it is determined that the optical disk drive is horizontal orientation when the difference between the first and second moving distances falls within a pre-determined value. Additionally, a first moving time is measured by using a first force driven on a movable optical pick up head for a pre-determined distance. Then, a second moving distance is measured by using a second force driven on the movable optical pick up head for the pre-determined distance, wherein the second force and the first force have opposite direction but the same amplitude. Next, when the difference between the first and second moving time falls within a pre-determined value, the optical disk drive is horizontal orientation.

13 Claims, 5 Drawing Sheets

METHOD OF DETECTING ORIENTATION OF OPTICAL DISK DRIVE

BACKGROUND OF THE INVENTION

1. Field of the Invention

The present invention relates to a method of detecting orientation of an optical disk drive, and in particular to a method of detecting horizontal or vertical orientations of an optical disk drive prior to a retrieval operation.

2. Description of the Related Art

In recent years, efforts and resources to improve optical disk drives have focused on facilitating data retrieval, wherein the data retrieval depends largely on a motor control system and a servo control system in an optical disk drive.

Conventionally, when an optical disk drive operates to retrieve data from an optical disk, a spindle motor is activated to rotate the optical disk. Then a laser pick up head is moved to an inter track of the optical disk. Next, a laser beam emitted from the laser pick up head is focused on the data layer of the optical disk. Then an object lens is moved for the laser beam following the track on the data layer. Next, a track number is read from a preformatted sector to identify the current position of the laser pick up head. If a difference between the current track and the target track exceeds 312 tracks (500 μm), a long seeking is activated. In long seeking, the laser pick up head is moved by a sled motor for moving the laser pick up head to a position within 50 tracks from the target track. Next, an object lens is moved to follow the laser beam on the track, and a track number is obtained to identify the current position. Next, a short seeking is activated to move the object lens to the target track. Then the data is retrieved.

As discussed above, data retrieval in an optical disk drive is accomplished through many steps. The long seeking process takes a lot of time and affects the data retrieval time. In order to shorten the time of long seeking, the sled motor is controlled by a velocity curve during the long seeking process. In this way, the sled motor can move the laser pick up head to the target track quickly. FIG. 2 is a schematic diagram of the servo control system of a conventional optical disk drive. Using FIG. 2 as an example, optical disk drive 100 retrieves data from optical disk 200 and transfers the retrieved data to an interface 300. The optical disk drive 100 contains a control circuit 110, which controls a spindle motor 120 through a spindle servo 122. The control circuit 110 also controls a focus device of the laser pick up head 130 through a focusing servo 132 and a tracking servo 134. The control circuit 110 also controls a sled motor 140 through a seeking servo 142 to move the laser pick up head 130 on the guide rail 150.

Referring to FIG. 1A, if the optical disk drive 100 is horizontal orientation, the roller of the spindle motor 120 has a direction along a Z-axis, the sled motor 140 drives the laser pick up head 130 on an XY-plane, focus servo 132 moves the focus device along a Z-axis, and the tracking servo 134 moves the focusing device on an XY-plane.

When the optical disk drive 100 is not horizontal orientation, the movement on the YZ-plane of laser pick up head 130 is influenced by gravity. Referring to FIG. 1B, the optical disk drive 100 is vertical orientation. In this case, the laser pick up head 130 on guide rail 150 moves in a direction parallel to the direction of gravitational force. Because of the gravitational force, when the laser pick up head 130 moves upward (+Z direction), it suffers inadequate moving length, and when the laser pick up head 130 moves downward (−direction), it suffers overrunning moving length. The tracking error produced by gravitational force is aggravated in long seeking process.

SUMMARY OF THE INVENTION

Accordingly, an object of the present invention is to provide a system and method of alignment measurement for an optical disk drive.

To achieve the above object, the present invention provides a method of detecting orientation of an optical disk drive. First, a first moving distance is measured by using a first force driven on a movable optical pick up head of the optical disk drive for a preset period. Next, a second moving distance is measured by using a second force driven on the movable optical unit for the preset period, wherein the second force and the first force have same amplitude but opposite direction. Next, it is determined whether the optical disk drive is horizontal orientation. When the difference between the first and second moving distances falls within a pre-determined value, the optical disk drive is horizontal orientation. The method can be put into practice in another way. First, a first moving time is measured by using a first force driven on a movable optical pick up head for a pre-determined distance. Then, a second moving time is measured by using a second force driven on the movable optical unit for the pre-determined distance, wherein the second force and the first force have same amplitude but opposite direction. Next, when the difference between the first and second moving times falls within a pre-determined value, the optical disk drive is horizontal orientation.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Next, with reference to the accompanying drawings, an embodiment of the present invention is described.

Figure 1A:
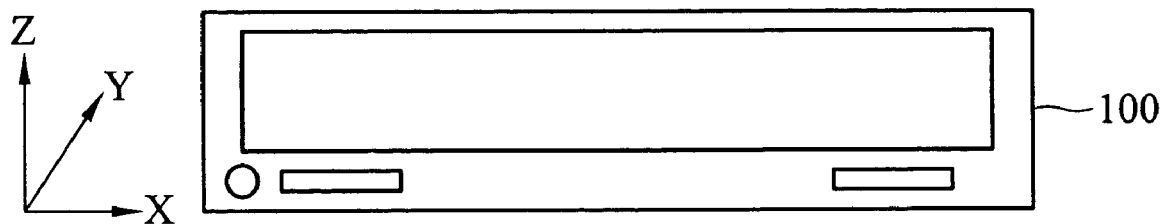
FIGS. 1A and 1B illustrate conventional optical disk drives in different orientations.
Figure 1B:
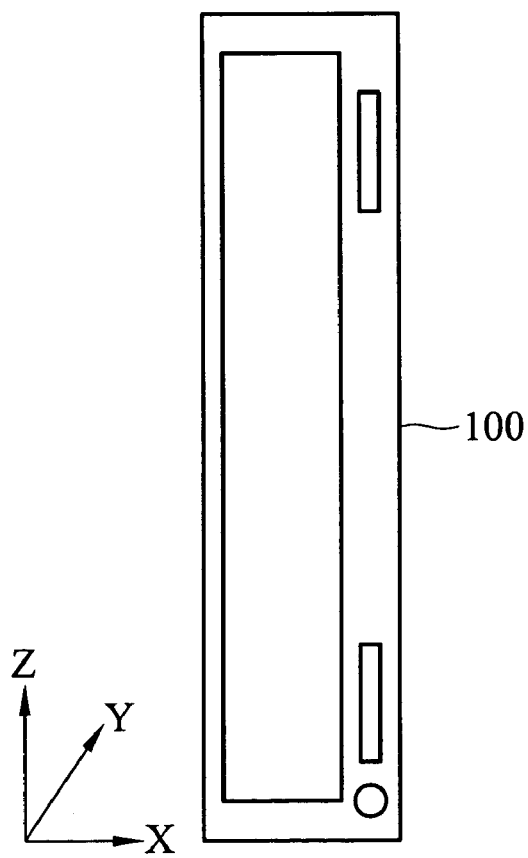
Figure 2:
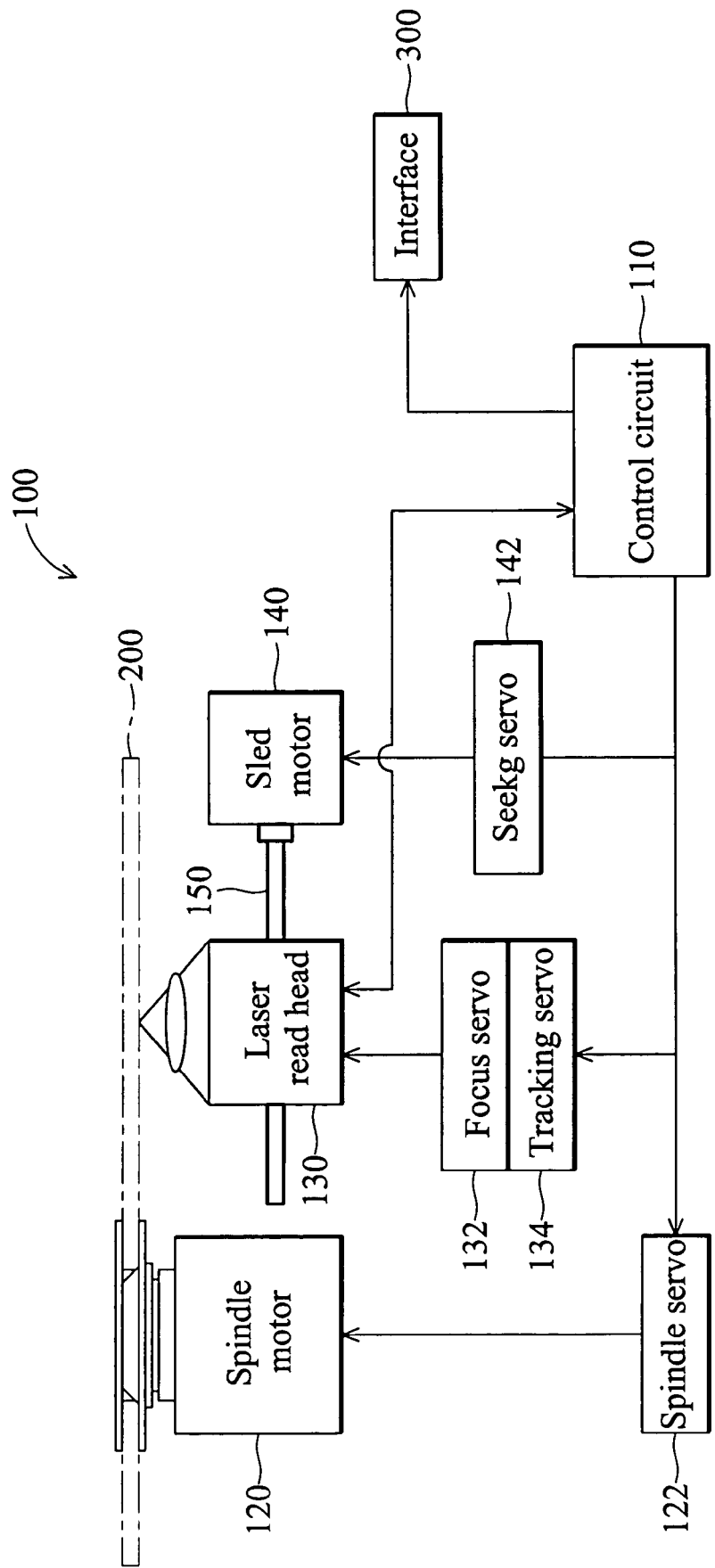
FIG. 2 is a schematic diagram showing a servo system in a conventional optical disk drive.
Figure 3:
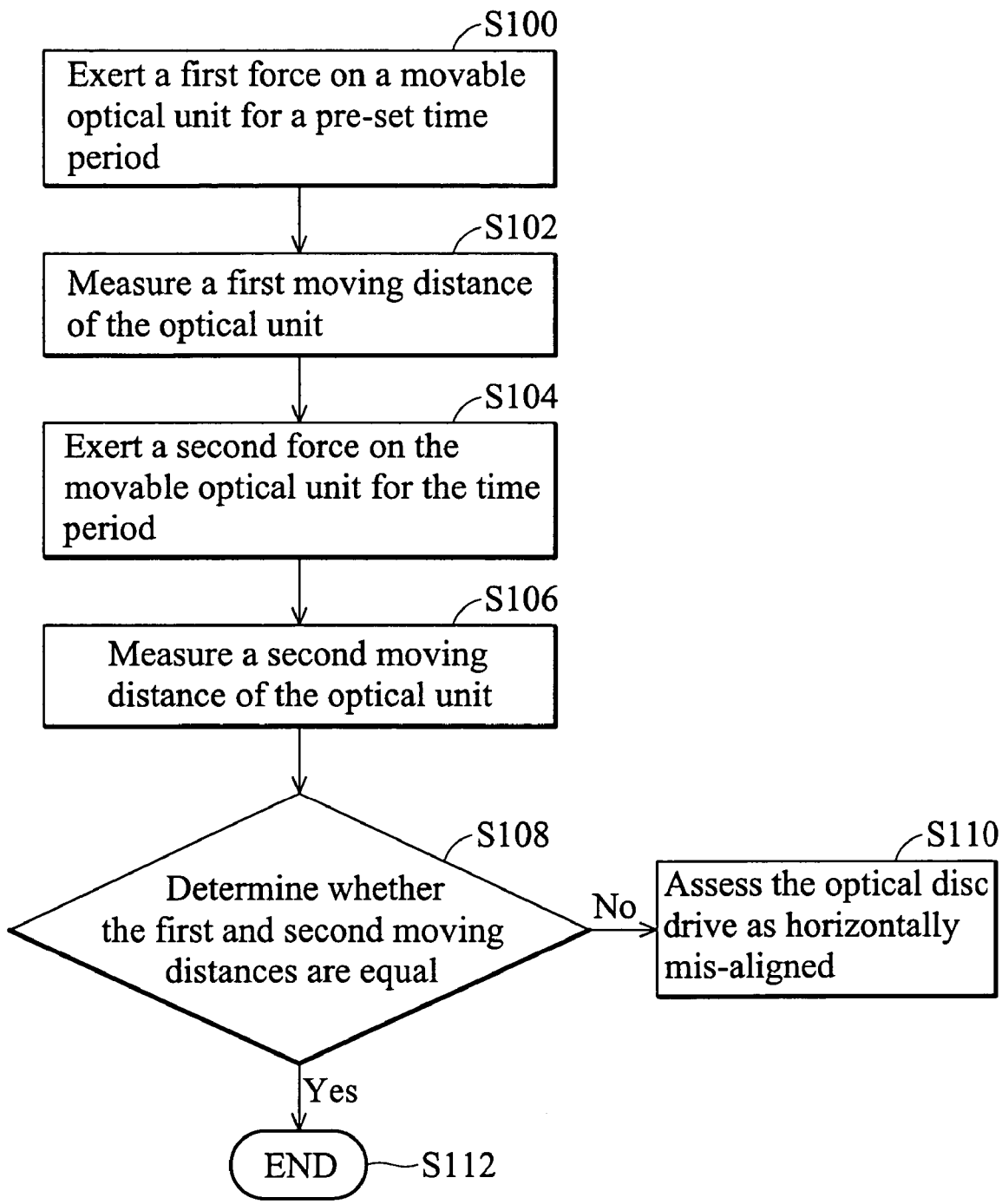
FIG. 3 is a flowchart of a method for detecting orientation of an optical disk drive in accordance with the first embodiment of the present invention.

FIG. 3 is a flowchart of a method of detecting horizontal or vertical orientation of an optical disk drive in accordance with the first embodiment of the present invention.

In step S100, a first force is driven on a laser pick up head of the optical disk drive for a preset period, driving the laser pick up head away from the spindle motor.

In step S102, a first moving distance of the laser pick up head is measured, wherein the first moving distance is produced by driving the first force (away from the spindle motor) on the laser pick up head for the preset time.

In step S104, the second force is driven on the laser pick up head for the preset period, driving the laser pick up head toward the spindle motor.

In step S106, a second moving distance of the laser pick up head is measured, wherein the second moving distance is produced by driving the second force (toward the spindle motor) on the laser pick up head for the preset time.

In step S108, it is determined if the first and the second moving distances are equal, and if so, the process proceeds to Step S112, and otherwise the process proceeds to Step S110.

In step 110, the optical disk drive is not horizontal orientation (vertical orientation). In step 112, the method ends.

In step S100, the first and second force can be a fixed voltage applied to a sled motor for driving the laser pick up head in different directions. In step S102, the moving distance is measured by a photo interrupter or a Hall sensor.

When the process proceeds to step S110, an inclined angle and a compensating gain of the optical disk drive are determined according to the difference between the first and second moving distances. According to the compensating gain, the sled motor consumes a higher voltage when driven in the direction opposite to gravitational direction, and a lower voltage when driven in the gravitational direction. Thus the compensated optical disk drive can achieve a better data retrieval rate. According to the embodiment of the present invention, the first and second force also can have same amplitude but opposite direction. It means that the voltage waveforms of driving the sled motor have the same amplitude but opposite phase. Therefore, the moving directions of the laser pick up head in steps S100 and S104 are opposite. Furthermore, the laser pick up head also can be moved toward the spindle motor in step S100, and away from the spindle motor in Step S104.

Figure 4:
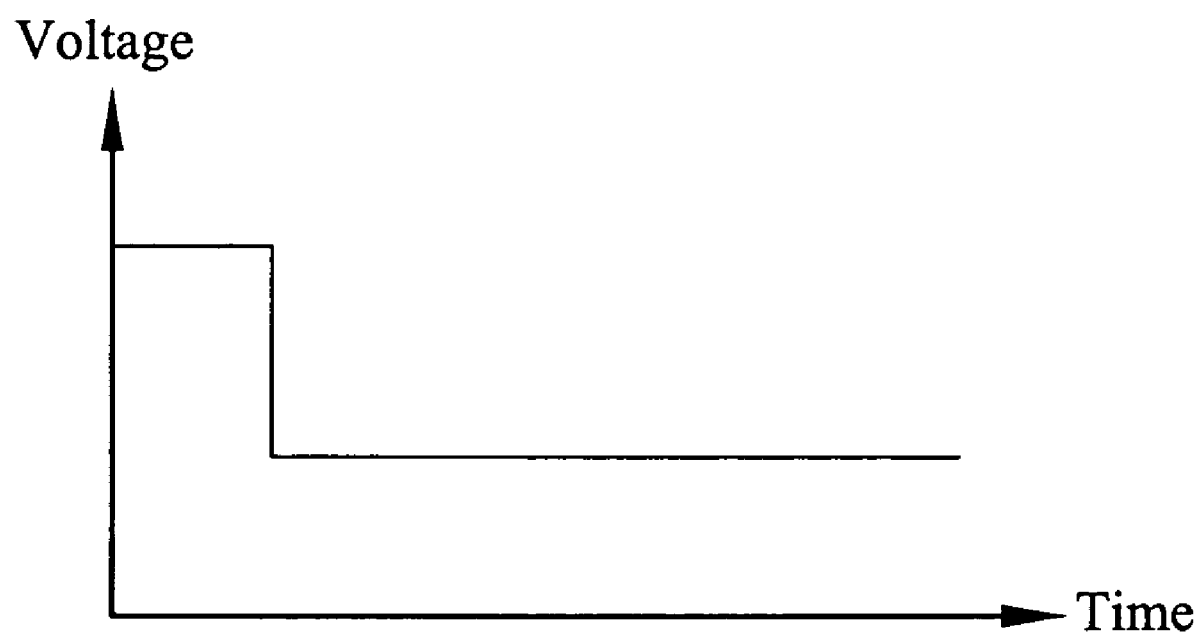
FIG. 4 illustrates a voltage waveform in accordance with an embodiment of the present invention.

To increase the accuracy of detecting the orientation of the optical drive, the voltage waveform applied to the sled motor can be time-varied waveform. Using FIG. 4 as an example, the applied voltage waveform is changed in stages. When moving away from the spindle motor, a higher voltage is applied to the sled motor for overcoming static friction initially, and then voltage waveform is lowered to drive the laser pick up head. It is noted that the voltage waveform should be have the same amplitude but opposite phase when the laser pick up head moves toward the spindle motor.

Figure 5:
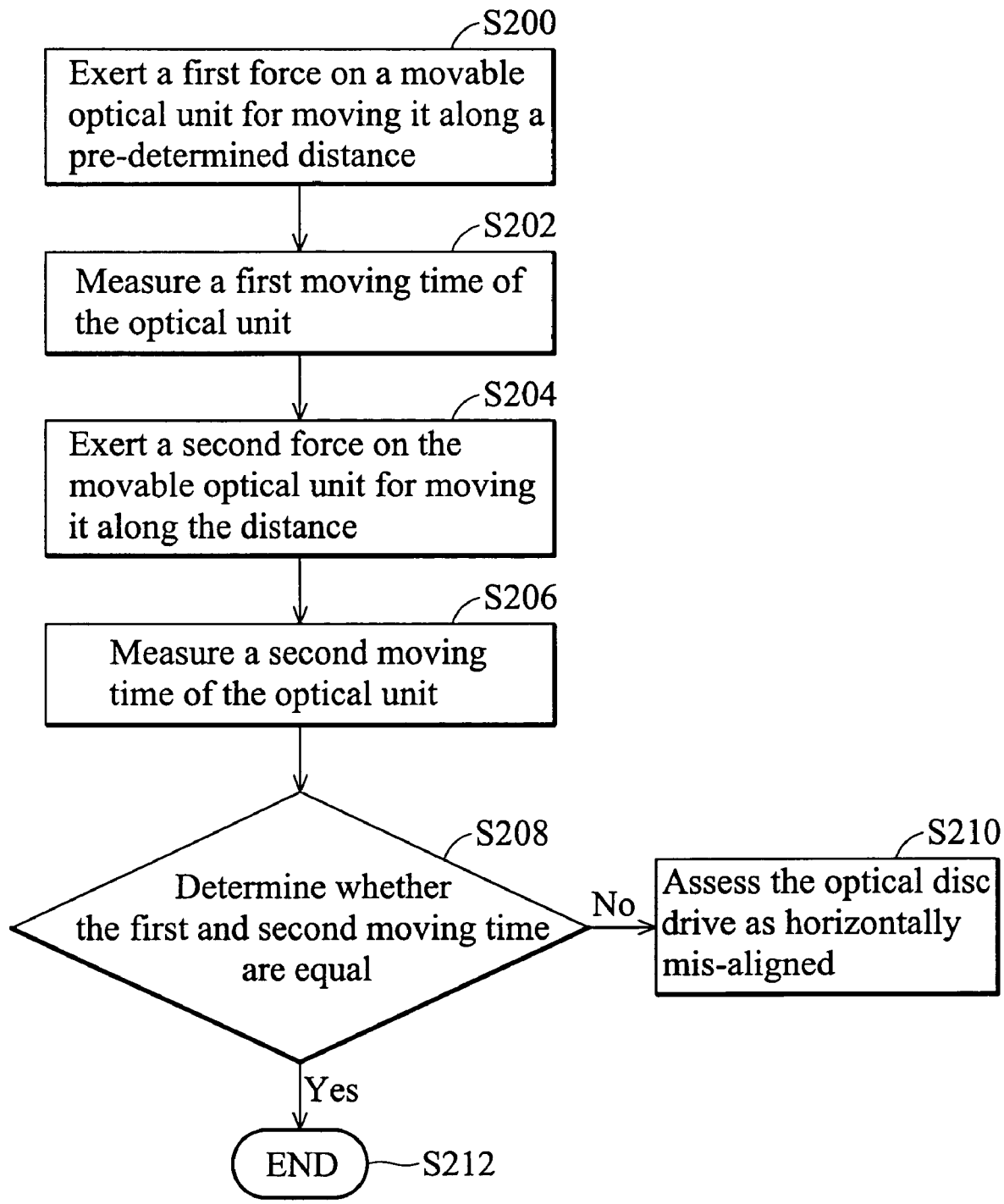
FIG. 5 is a flowchart of a method for detecting orientation of an optical disk drive in accordance with the second embodiment of the present invention.

FIG. 5 is a flowchart of a method for detecting orientation of the optical disk drive in accordance with the second embodiment of the present invention.

In step S200, a first force is driven on a laser pick up head of the optical disk drive away from the spindle motor for a pre-determined distance.

In step S202, a first moving time of the laser pick up head is measured.

In step S204, a second force is driven on the laser pick up head toward the spindle motor for the pre-determined distance.

In step S206, a second moving time of the laser pick up head is measured.

In step S208, it is determined if the first and the second moving times are equal, and if so, the process proceeds to Step S212, and otherwise the process proceeds to Step S210.

In step 210, the optical disk drive is not horizontal orientation (vertical orientation). In step 212, the method ends.

The first and second forces have same amplitude but opposite direction. Therefore, the moving directions of the laser pick up head in steps S200 and S204 are opposite. The laser pick up head also can be moved toward the spindle motor in step S200, and away from the spindle motor in Step S204.

To increase the accuracy of detecting orientation of the optical disk drive, the voltage waveform applied to the sled motor can be time-varied waveform. Using FIG. 4 as an example, the applied voltage waveform is changed in stages. When moving away from the spindle, a higher voltage is applied to the sled motor for overcoming static friction initially, and then voltage waveform is lowered to drive the laser pick up head. It is noted that the voltage waveform should be have the same amplitude but opposite phase when the laser pick up head moves toward the spindle motor.

According to the first embodiment mentioned above, the optical disk drive is horizontal orientation when the first and the second moving distances are equal. Under some circumstances, when the difference between the first and the second moving distances falls within a pre-determined error tolerance, the optical disk drive also can be assessed as horizontal orientation.

In the second embodiment mentioned above, the optical disk drive is horizontal orientation when the first and the second moving times are equal. Similarly, in some circumstances, when the difference between the first and the second moving time falls within a pre-determined error tolerance, the optical disk drive also can be assessed as horizontal orientation.

The present invention provides a method of detecting orientation of an optical disk drive, which can determine whether the optical disk drive is operating in a horizontal orientation and provide compensating gain when the optical disk drive is not horizontal orientation.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of detecting orientation of an optical disk drive, comprising the steps of:
   driving a first force on a movable optical pick up head of the optical disk drive for a preset period;
   measuring a first moving distance of the movable optical pick up head;
   driving a second force on the movable optical pick up head for the preset period, wherein the second force and the first force have opposite direction but same amplitude;
   measuring a second moving distance of the optical unit; and
   determining the difference between the first and second moving distances;
   determining the optical disk drive as horizontal orientation when the difference falls within a pre-determined value.

2. The method of claim 1, further comprising determining a inclined angle and an compensating gain signal of the optical disk drive according to the difference when the difference exceeds the pre-determined value.

3. The method of claim 1, wherein the amplitude of the first force and the second force are time varied forces.

4. The method of claim 1, wherein the first force is directed away from a spindle motor of the optical disk drive.

5. The method of claim 1, wherein the second force is directed toward a spindle motor of the optical disk drive.

6. The method of claim 1, wherein the first and the second distances are measured by a photo interrupter or a Hall sensor.

7. The method of claim 1, wherein the first force and the second force have a fixed magnitude.

8. A method of detecting orientation of an optical disk drive, comprising the steps of:
   driving a first force on a movable optical pick up head of the optical disk drive for a pre-determined distance;
   measuring a first moving time of the movable optical pick up head;
   driving a second force on the movable optical pick up head for the pre-determined distance, wherein the second force and the first force have the same amplitude but opposite direction;
   measuring a second moving time of the movable optical pick up head;
   determining the difference between the first and second moving time;
   determining the optical disk drive as horizontal orientation when the difference falls within a pre-determined value.

9. The method of claim 8, further comprising determining a inclined angle and a compensating gain of the optical disk drive according to the difference between the first and second moving times.

10. The method of claim 8, wherein the amplitude of the first force and the second force are time varied forces.

11. The method of claim 8, wherein the first force is directed away from a spindle motor of the optical disk drive.

12. The method of claim 8, wherein the second force is directed toward a spindle motor of the optical disk drive.

13. The method of claim 1, wherein the first force and the second force have a fixed magnitude.

* * * * *